United States Patent
Lacoste

[11] Patent Number: 5,882,042
[45] Date of Patent: Mar. 16, 1999

[54] CONNECTOR FOR FREON HOSE ASSEMBLY

[76] Inventor: Marvin Lacoste, P.O. Box 292, Kiln, Mich. 39556

[21] Appl. No.: 717,827

[22] Filed: Sep. 23, 1996

[51] Int. Cl.[6] .................................................. F25B 45/00
[52] U.S. Cl. ........................... 285/18; 285/354; 285/179; 285/386; 62/292; 62/77
[58] Field of Search ............................... 285/18, 38, 354, 285/386, 387, 388, 389; 62/57, 77, 149, 292

[56] References Cited

U.S. PATENT DOCUMENTS

| | | | |
|---|---|---|---|
| 1,450,606 | 4/1923 | Paine | 285/388 |
| 1,810,115 | 6/1931 | Wanl et al. | 285/387 |
| 3,361,450 | 1/1968 | Frank | 285/354 |
| 3,615,109 | 10/1971 | Brinda et al. | 285/354 |
| 4,332,273 | 6/1982 | Boyde | 62/292 |
| 4,516,278 | 5/1985 | Lamond | 285/387 |
| 4,535,802 | 8/1985 | Robertson | 62/292 |
| 5,333,467 | 8/1994 | Pearl, II et al. | 62/77 |

FOREIGN PATENT DOCUMENTS

| | | | |
|---|---|---|---|
| 996550 | 12/1951 | France | 285/354 |
| 1150922 | 5/1969 | United Kingdom | 285/354 |

*Primary Examiner*—Eric K. Nicholson
*Attorney, Agent, or Firm*—Garvey, Smith, Nehrbass & Doody, LLC

[57] ABSTRACT

A connector body at the end of a freon line, of the type which is freely rotatable on the line, and is able to move from a first position adjacent the freon hose surrounding the line to a second position at the end of the line for threadably engaging an air conditioner or the like, the nut in its passage moving past an elbow bend in the line. The connector would comprise at least a connector body having a width substantially wider than the width of a grasping forefinger and thumb, and further comprising a counter bore along its rear end portion, so that as the connector moves from its first position through the elbow of the line, the bend in the line would travel within a portion of the counter bore and allow the nut to slide between its first and second positions without jamming in its passage along the elbow bend.

6 Claims, 2 Drawing Sheets

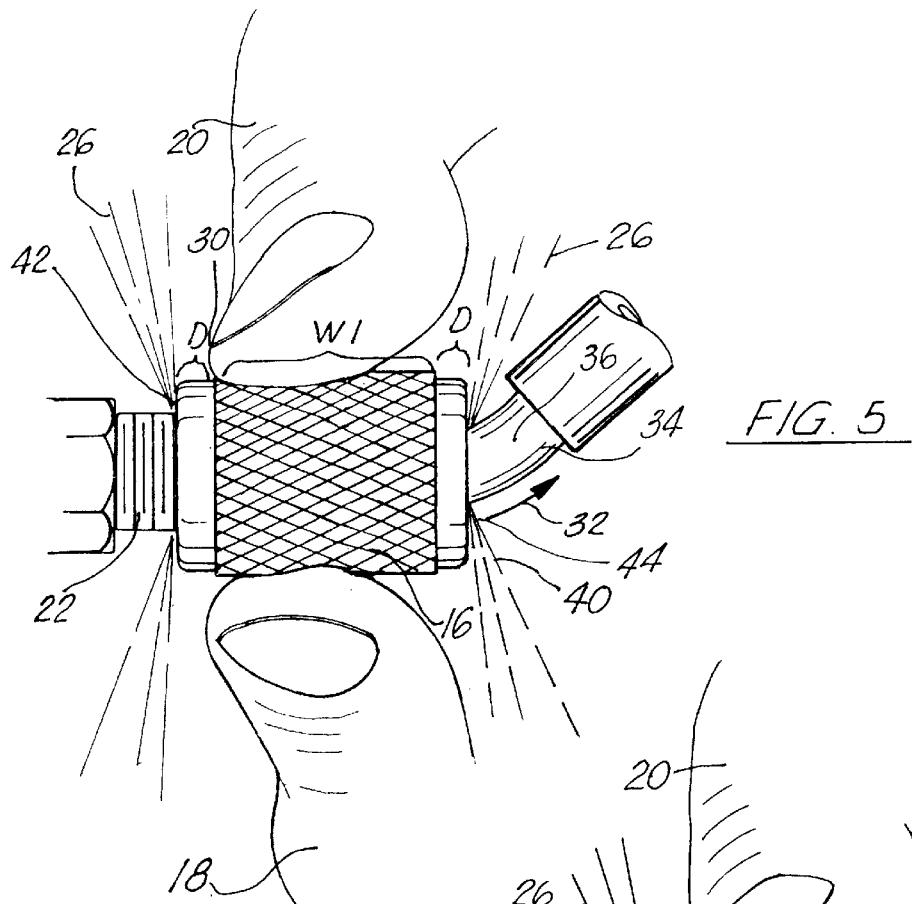
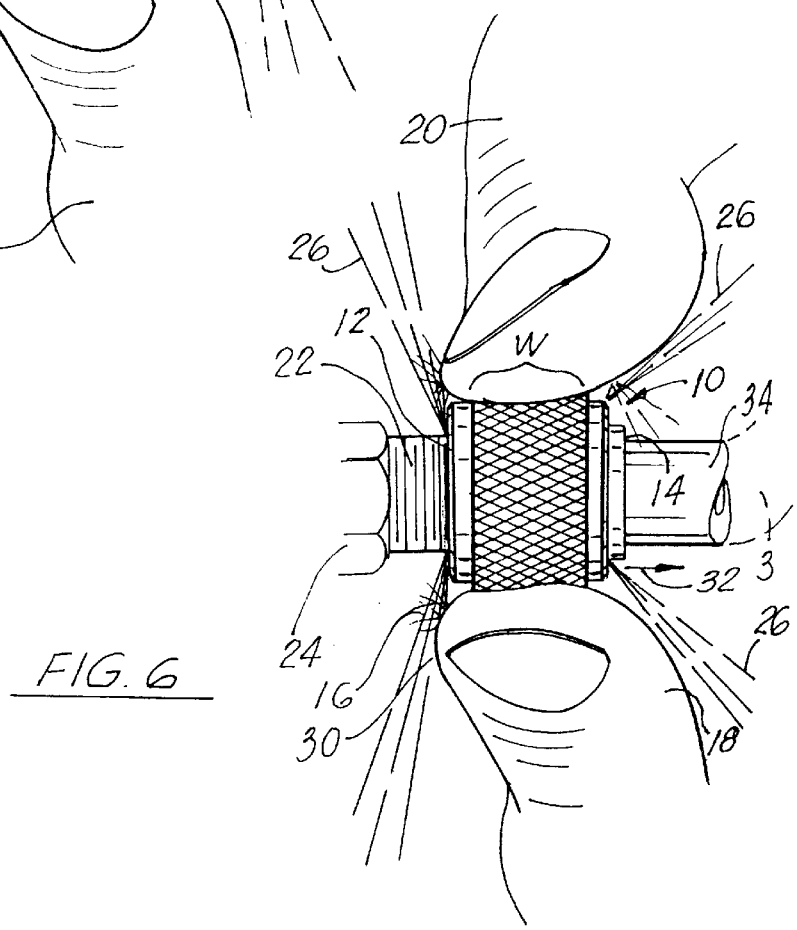

CONNECTOR FOR FREON HOSE ASSEMBLY

BACKGROUND OF THE INVENTION

FIELD OF THE INVENTION

The apparatus of the present invention relates to connectors. More particularly, the present invention relates to a threaded connector which provides for a safer yet more efficient connector for a freon hose, particularly when the hose is being disconnected from the source of pressurized freon.

GENERAL BACKGROUND

In the field of air conditioning, air conditioning systems must be initially pressurized with freon, or the system must, from time to time, be repressurized due to a loss of freon in the system. Additionally, testing of the system must be undertaken from time to time while the system is under pressure. In each of these instances, it is necessary that a threaded connection be established between the source of freon and either the testing unit or the air conditioning system itself. Such a connection is quite common in the art, and is generally a threaded collar which is able to slide along the end of the freon line, and as it threadably connects to the system or the testing unit, the connector establishes a connection which is fluid proof, and does not leak either during testing or pressurization.

Such a test as was stated earlier is done under somewhat high pressure, so that following the task of either pressurizing the air conditioning system or undergoing the testing of the system, the pressurization in the freon line would remain. When this occurs, when one manually threadably disconnects the connector from the testing unit, freon, under pressure, would escape quite rapidly when the fluid connection is broken. Because of the nature of freon, which is a fluid that is extremely cold, the escaping freon would serve as a potentially dangerous substance, should it make contact with the human skin. Under the current state of the art, the connector at the end of the line is substantially the width of the human finger. This is so because the connector which slides along the freon line must slide past an elbow in the line, so as to give the end of the line more adaptability to certain positions as it is making a connection on to the system of the testing unit. Because of the fact that it must be no wider than that particular width, when a person would grasp the connector surface, very often the escaping freon would make contact with the human skin and cause a burn either on the forefinger or the thumb which is uncomfortable and may result in a serious injury.

Therefore, it would be of importance to have a connection nut at the end of the line which is substantially wider than the human finger so that as one would manually disconnect the nut from the line, the grasping surface of the nut would be sufficient wide so that as one's forefinger and thumb grab the surface, the surface would be wider at both edges and therefore, when freon would excape, there would be no problem with the escaping freon making contact with the human skin.

SUMMARY OF THE PRESENT INVENTION

The present invention would solve the problems in the art in a simple and straight forward manner. What is provided is a connector at the end of a freon line, of the type which is freely rotatable on the line, and is able to move from a first position adjacent the freon hose surrounding the line to a second position at the end of the line for threadably engaging an air conditioner or the like, the nut in its passage moving past an elbow bend in the line. The connector would comprise at least a connector body having a width substantially wider than the width of a grasping forefinger and thumb, and further comprising a counter bore along its rear end portion, so that as the connector moves from its first position through the elbow of the line, the bend in the line would travel within a portion of the counter bore and allow the nut to slide between its first and second positions without jamming in its passage along the elbow bend.

It is therefore a principal object of the present invention to provide an improved connector for a freon line, which may be grasped between the forefinger and the thumb safely, without the forefinger and thumb overlapping the edge of the connector body;

It is a further principal object of the present invention to provide an improved connector for a freon line, which has a counter bore along its rear end, so that it may travel along a freon line which has an elbow bend in the line and slide past the elbow without jamming at the point of the elbow bend;

It is a further object of the present invention to provide a safer and more improved connector for a freon line so that the connector enables one to grasp the connector without making contact with escaping freon under pressure, yet allows the connector to move past an elbow bend in the freon line thus giving it more adaptability towards uses in all situations.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 5 illustrates an overall view of a human forefinger and thumb grasping the improved connector body of the present invention; and FIG. 6 illustrates the human hand grasping the current connector body offered in the industry, where the escaping freon is making contact with the thumb of the operator.

DETAILED DESCRIPTION OF THE PREFERRED EMBODIMENT

Figure 1:
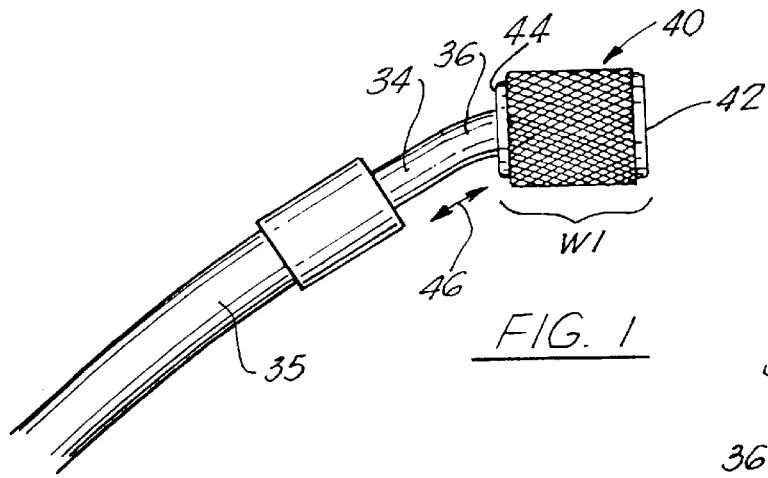
FIG. 1 illustrates an overall view of the improved connector body positioned at the end of a freon line.

FIGS. 1–5 illustrate the preferred embodiment of the apparatus of the present invention, with FIG. 6 illustrating the current state of the art. Prior to a discussion of the present invention, reference is made to FIG. 6, which illustrates a connector body 10 currently on the market being circular in cross section, and having a first threaded end 12, a second free end 14, and an outer gripping knurled surface 16 which may be gripped between a thumb 18 and a forefinger 20 as illustrated. As seen in FIG. 6, the body portion 10 is a certain width W which is substantially less than the width of the thumb 18 and forefinger 20, as illustrated. As seen in FIG. 6, the body 10 is being threadably disengaged from a threaded connector 22 of a line 24 where there is maintained freon under pressure. When the body is disengaged to a certain point, the freon under pressure escapes (lines 26) and in doing so makes contact with the skin 30 of the operator, thus causing burn or injury to the skin on both the thumb and the forefinger. The reason that the body member 10 is of that particular width W is that when the body is finally disengaged from threaded connector 22, the body 10 would slide rearward in the direction of arrow 32 along line 34 and would have to pass an elbow 36 as seen in phantom view in FIG. 6. In order for the body 10 to pass that elbow as it moves rearward along line 34, the width is critical since if it were to be a wider width, it could not slide past elbow 36, but would get jammed up at that point.

Reference therefore is made to FIGS. 1 and 5 where there is seen improved connector body 40 of the present invention, circular in cross-section, having again a first threaded end 42 and a second non threaded end 44. As seen in FIG. 1, connector body is again freely movable in the direction of arrow 46 along line 34 which is a typical copper or other metallic line, housed within an insulation layer 35 as is found in the art. As is seen again in FIG. 1, line 34 again includes an elbow bend 36 along its path. Parenthetically, the reason that elbow bend 36 is present is that the bend in the line gives the installer of the line more flexibility in installing the line onto connectors 22 which are found in more tight fitting places and because of the bend or the elbow 36 in the line, it is easier to accommodate this type of connection.

Figure 2:
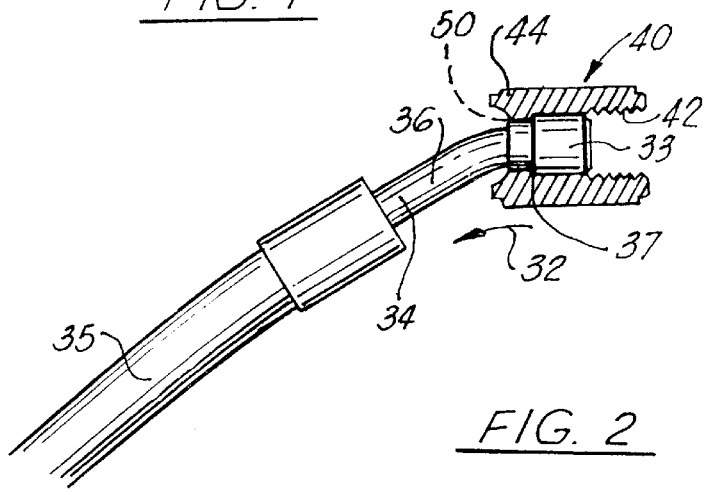
FIG. 2 illustrates a cross sectional view as illustrated in FIG. 1.

FIG. 2 illustrates a cross section of the connector for the improved connector body 40 as seen in FIG. 1. Again, it is noted that there is a threaded end 42, a non-threaded end 44 with the connector body engaged upon line 34. Prior to a discussion of a certain feature of the apparatus, reference is made to FIG. 5 where there is illustrated the improved connector body 40 being engaged upon a threaded connector 22 through its threaded first end 42. As is illustrated, the width of connector body noted as W1 is substantially longer in length than the width W of the prior art connector body 10 (FIG. 6) and also including an additional length of a knurled surface 16 for gripping the connector body between the thumb 18 and the forefinger 20. This increased width W1 of surface 16 is important because, as is illustrated in FIG. 5, the operator who is manually disengaging body 40 from the threaded line 22 is able to grip the connector body a certain distance D from both ends 42, 44 of the body which are distances sufficient to prevent the skin 30 of the operator from making contact with the escaping freon from each end 42, 44 (lines 26) as seen in the FIGURE. Therefore, while the operator may still fully grasp surface 16 with the thumb 18 and forefinger 20, and disconnect it from threaded connector 22, because of the increased width W1 of the knurled surface 16, one is able to positioned the thumb 18 and forefinger 20 at a distance rearward of the end 42 sufficient to prevent that contact with freon 26.

However, it would be beneficial to have the connector body slide in the direction of arrow 32 as does the prior art body, past elbow 36 in line 34 for the same reasons as expressed earlier. However, were the connector body 40 made in the same manner as the prior art connector body 10, due to its increased width W1, it would in all likelihood jam at the elbow 36 and be unable to move rearward of the elbow because of its increased width W1.

Figure 3:
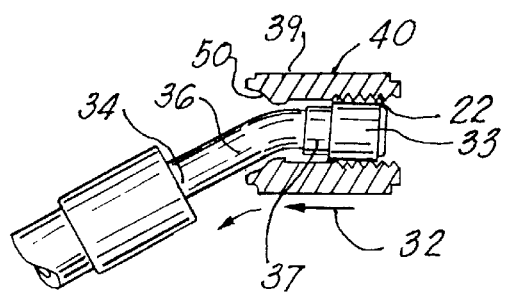
FIG. 3 illustrates an overall view of the connector body as it is moved from its first position as illustrated in FIG. 1 to its second position adjacent the connector hose of the freon line.
Figure 4:
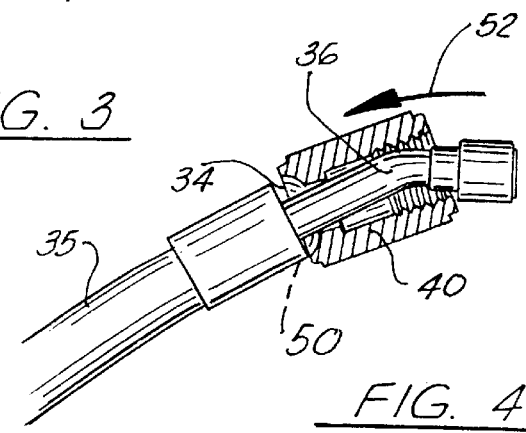
FIG. 4 illustrates a cross sectional view of the connector body as it is moving past the elbow bend in the freon line.

In order to overcome this problem, reference is made to FIGS. 2–4 which as seen in cross section, improved connector body again having its threaded end 42, its rear end 44, and at the end of the line 34, which also shows elbow joint 36. At the end of line 34, there is illustrated enlarged end 33 as it rests within body 40. In FIG. 2, enlarged end 33 includes a collar portion 37 which rests within an enlarged opening 39 as seen in FIG. 2. Opening 39 is slightly greater than the width of inner metal tube 36, and therefore as seen in FIG. 4, when elbow 36 is moving through the opening 39 as illustrated in FIG. 3, the enlarged opening accommodates the elbow as does the counter bore 50 and the enlarged opening 39 of body 40. If one would want to move the connector body rearward in the direction of line 32, the rear end 44 of the body has been formed with a counter bore 50 which is of a particular depth of body 40, so that as the body 40 moves in the direction of arrow 32, a portion of the counter bore 50 is occupied by the elbow 36 as seen in FIG. 32, and therefore body 40 is able to slide along line 34 rearwardly to the position as seen in FIG. 4. Therefore, although there is an elbow joint 36 in line 34, because of the counter bore 50 in the rear end 44 of body 40, the counter bore serves as a means for allowing the bend or elbow 36 in line 34 to fill a part of the counter bore and enable the body to slide easily along the line past the elbow of bend 36 and be comfortably resting against the end of the insulation 35 as seen in FIG. 3. It is with this particular feature that allows the body 40 to have the increased width W1 of the knurled surface 16 which allows the operator to firmly grasp the body without getting burned by the freon yet also allow the body to slide in the direction of arrow 32 and return in the direction of arrow 52 to its operating position where it would be threaded onto a line as seen in FIG. 5.

The following table lists the part numbers and part descriptions as used herein and in the drawings attached hereto.

| PARTS LIST | |
|---|---|
| Description | Part No. |
| connector body | 10 |
| threaded end | 12 |
| free end | 14 |
| knurled surface | 16 |
| thumb | 18 |
| forefinger | 20 |
| threaded connector | 22 |
| line | 24 |
| freon | 26 |
| skin | 30 |
| arrow | 32 |
| line | 34 |
| insulation layer | 35 |
| elbow | 36 |
| connector body | 40 |
| first threaded end | 42 |
| non threaded end | 44 |
| counter bore | 50 |
| distance | D |
| width | W |
| width | W1 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An improved connection system for a line carrying freon to an air-conditioning system, the connector comprising:

a. a line, having an inner metal tube for carrying freon under pressure, positioned within an outer insulating tube, the inner metal tube including an enlarged end portion, and extending a distance beyond the insulating tube and terminating in a sealing ring;

b. an elbow bend formed in the line between the terminating point of the outer insulating tube and the end of the line;

c. a connector body for engaging the line to the air-conditioning system, so that freon may be transported under pressure, the body further comprising a body portion, having a first threaded end, a second end, and a continuous bore therethrough, for allowing the body to be slidingly accommodated along the inner metal tube having the enlarged portion; and d. a counter bore in the second end of the connector body of sufficient diameter, the counter bore together with an enlarged opening in the connector body allowing the connector body to slide between the threaded end of the inner metal tube to a point adjacent the terminating point of the insulating tube, through the elbow bend in the inner metal tube.

2. The system in claim 1, wherein the connector body is of sufficient width to accommodate grasping between the thumb and forefinger of an operator, without the thumb or forefinger overlapping the first end of the connector, preventing contact with the escaping freon under pressure.

3. The system in claim 1, wherein a portion of the line wall is accommodated within the counter bore of the connector, which allows connector body to slide past the elbow in the line.

4. An improved system for transporting freon under pressure to an air-conditioning system, of the type where the freon transported through a line, having an inner metal tube for carrying the freon under pressure, the inner metal tube positioned within an outer insulating tube, and the line extending a distance beyond the insulating tube and terminating in an enlarged diameter sealing ring; an elbow bend formed in the line between the terminating point of the outer insulating tube and the end of the line; the improvement comprising:

a connector member, for sealably engaging the inner metal tube to the air-conditioning system, the member further comprising a body portion, having a first threaded end, a second end, and a continuous bore therethrough of sufficient diameter to accommodate the enlarged sealing ring, for allowing the body to be slidingly accommodated along the inner metal tube; a counter bore in the second end of the connector body of sufficient diameter, together with an enlarged bore of the body portion, to allow the connector body to slide between the threaded end of the inner metal tube to a point adjacent the terminating point of the insulating tube, through the elbow bend in the inner metal tube; the connector body being of sufficient width to accommodate grasping between the thumb and forefinger of an operator, without the thumb or forefinger overlapping the first end of the connector, preventing contact with the escaping freon under pressure.

5. The improved system in claim 4, wherein a portion of the line wall is accommodated within the counter bore of the connector, which allows connector body to slide past the elbow in the line.

6. An improved connection system for a line carrying freon to an air-conditioning system, the connector comprising:

a. a line, having an inner metal tube for carrying freon under pressure, positioned within an outer insulating tube, the line extending a distance beyond the insulating tube and terminating in a sealing ring;

b. an elbow bend formed in the line between the terminating point of the outer insulating tube and the end of the line;

c. a connector member, for engaging the line to the air-conditioning system, so that freon may be transported under pressure, the member further comprising a body portion, having a first threaded end and a second end, and a continuous bore therethrough, for allowing the body to be slidingly accommodated along the line;

d. a counter bore in the second end of the connector body of sufficient diameter to allow the connector body to slide between the threaded end of the line to a point adjacent the terminating point of the insulating tube, through the elbow bend in the line;

e. the connector body being of sufficient width to accommodate grasping between the thumb and forefinger of an operator, without the thumb or forefinger overlapping the first end of the connector, to prevent contact with the escaping freon under pressure.

* * * * *